United States Patent
Seppänen

(10) Patent No.: US 6,260,777 B1
(45) Date of Patent: Jul. 17, 2001

(54) METHOD AND EQUIPMENT FOR MANUFACTURING PREDETERMINED LOW BARK CONTENT WOOD CHIPS AND A HIGH BARK CONTENT FUEL FRACTION FROM WOOD CHIPS WITH BARK ATTACHED

(75) Inventor: Veli Seppänen, Jyvaskyla (FI)

(73) Assignee: Valtion teknillinen tutkimuskeskus, Espoo (FI)

( * ) Notice: Subject to any disclaimer, the term of this patent is extended or adjusted under 35 U.S.C. 154(b) by 0 days.

(21) Appl. No.: 09/068,273

(22) PCT Filed: Nov. 1, 1996

(86) PCT No.: PCT/FI96/00586

§ 371 Date: Apr. 30, 1998

§ 102(e) Date: Apr. 30, 1998

(87) PCT Pub. No.: WO97/16590

PCT Pub. Date: May 9, 1997

(30) Foreign Application Priority Data

Jan. 11, 1995 (FI) ........................................ 955213

(51) Int. Cl.$^7$ .................................................. B02C 19/12
(52) U.S. Cl. ........................... 241/19; 241/24.2; 241/28; 241/81
(58) Field of Search ................................. 241/28, 81, 19, 241/24.2

(56) References Cited

U.S. PATENT DOCUMENTS

| | | | | |
|---|---|---|---|---|
| 4,036,440 | * | 7/1977 | Makila et al. | 241/28 |
| 4,332,353 | * | 6/1982 | Lario et al. | 241/28 |
| 5,000,390 | * | 3/1991 | Marrs | 241/28 |
| 5,137,621 | * | 8/1992 | Brown | 241/81 |
| 5,577,671 | * | 11/1996 | Sappanen et al. | 241/28 |
| 5,709,257 | * | 1/1998 | Vinogradov et al. | |

FOREIGN PATENT DOCUMENTS

WO 93/25324 * 12/1993 (WO).

* cited by examiner

Primary Examiner—Mark Rosenbaum
(74) Attorney, Agent, or Firm—Fildes & Outland, P.C.

(57) ABSTRACT

A method and equipment manufacturing predetermined low bark content wood chips and a high bark content fuel fraction from wood chips with bark attached, includes mechanical bark removal treatment, in which the bark is removed from the chips and their size is reduced; pre-cleaning of the flow of chips with bark attached, into a flow of chips with a bark content of less than 10% and high bark content rejects, with the aid of pneumatic and mechanical sieving; final cleaning of the aforesaid wood chip flow from the pre-cleaning, with the aid of an optical separator, to create low bark content wood chips and a fraction with a higher bark content; collection of the rejects leaving the process, to create the aforementioned high bark content fuel fraction; and seiving out of the flow of wood chips, before the mechanical bark removal process, a predetermined thin fraction of the chips, which bypasses the debarking process.

9 Claims, 2 Drawing Sheets

METHOD AND EQUIPMENT FOR MANUFACTURING PREDETERMINED LOW BARK CONTENT WOOD CHIPS AND A HIGH BARK CONTENT FUEL FRACTION FROM WOOD CHIPS WITH BARK ATTACHED

FIELD OF THE INVENTION

This invention relates to a method and equipment for manufacturing predetermined low bark content wood chips and a high bark content fuel fraction from wood chips with bark attached. More specifically the method includes a mechanical bark removal process, pre-cleaning of wood chips with bark attached, and final cleaning of the flow of wood chips, with the aid of an optical separator.

BACKGROUND OF THE INVENTION

A wood bark manufacturing method is known from international patent publication WO 93/25324. According to this, the wood chips with bark attached are ground initially either with a special plate grinder, or with a vibrating cone crusher, wherein the bark separates from the wood chips and the size of the bark particles diminishes. Thereby, the bark can be separated more easily during later separation stages. A grinder or a vibrating cone crusher is followed by pneumatic separation, to separate outer birch bark, after which sawdust is removed using a vibrating sieve. The bark content has now dropped to considerably less than 10%, and the final cleaning can be carried out using an optical sorter. According to the patent, two optical sorters are used in series, but can, however, be replaced by a single more powerful device. The accepted fraction from the second optical sorter is led to grinding and the reject to the fuel fraction.

Equipment that is essentially that described by the application has been built in Kankaanpää in Finland, the supplier being BMH Wood Technology Oy. In the commercial equipment, a magnetic separator and a pneumatic separator are used in the pre-cleaning to separate metal scrap and stones. Sawdust is removed from the commercial equipment before grinding, and after grinding the vibrating sieve is replaced by a so-called pocket-roll sieve (a roller sieve developed especially for sieving sawdust). In the commercial equipment, a good yield is achieved with a bark content of about 1%, which is sufficiently clean for the manufacture of certain grades of cellulose. The yield varies between 60–70%, depending on the species of timber and other factors. If cleaner chips are wanted, the yield drops, and correspondingly improves with a poorer level of cleanliness.

SUMMARY OF THE INVENTION

An object of the present invention is to achieve a better yield than previously at each corresponding level of cleanliness.

The characteristic features of the method for manufacturing predetermined low bark content wood chips and a high bark content fuel fraction from wood chips with bark attached, includes the steps of:

mechanical bark removal treatment, in which the bark is removed from the chips and their size is reduced, pre-cleaning of the flow of chips with bark attached, into a flow of chips with a bark content of less than 10% and high bark content rejects, with the aid of pneumatic and mechanical sieving, final cleaning of the aforesaid wood chip flow from the pre-cleaning, with the aid of an optical separator, to create low bark content wood chips and a fraction with a higher bark content, and collection of the rejects leaving the process, to create the aforementioned high bark content fuel fraction, characterized in that before the mechanical bark removal process, a predetermined thin fraction of the chips, is sieved out of the flow of wood chips, and then bypasses the debarking process.

The mechanical bark removal process may take place by means of a grinder, press-rollers, or a crusher. Alternatively, the mechanical bark removal takes place using a blade ring chipper, which cuts the wood chips into smaller pieces, while removing the bark.

According to the method, 20–100% of the fraction with a higher bark content obtained from the optical separator is directed to the fuel fraction, and correspondingly 80–0% is returned to the mechanical bark removal process. The optical separator includes a pneumatic conveyor and a division plate, by means of which the flow of chips is divided first into the said wood chips with a low bark content and wood chips with a higher bark content and further the latter part is divided with the aid of the division plate directly into a fuel fraction and the said part that is returned.

The method may include a pre-separation step before the thickness sieving step, in which the oversized wood chips, stones, and metals are removed from the wood chips with bark attached.

The flow of wood chips from the mechanical bark removal process and the thin chip fraction from the thickness sieving may be sieved using a mechanical sieve, to remove sawdust as a third reject and using a pneumatic separator to remove light birch bark, leaves, needles, and other airborne material as a fourth reject.

Equipment for manufacturing wood chips with a low bark content from wood chips with bark attached, which equipment includes mechanical bark removal devices and pre-separation devices consisting of a mechanical and a pneumatic separator and an optical sorter. The equipment is characterized in that it includes a wood chip thickness sieve located before the mechanical bark removal devices and a correction line connected to the exit of the thin fraction obtained, by means of which the thin fraction is taken past the mechanical bark removal devices to the pre-cleaning devices.

The mechanical bark removal devices may consist of at least one of a blade ring chippers, a grinder, a press roller, and a crusher.

The distribution values of the wood chip fractions according to the accompanying table are, to a great extent, the point of departure of the invention:

| Sieve gap mm | Fraction remaining in sieve % | Clean wood chips in fraction | Wood chips with bark | Bark % of wood chips with bark |
|---|---|---|---|---|
| 0 | 5,03 | | | |
| 2 | 16,73 | 79,03 | 1,96 | 3,61 |
| 4 | 37,94 | 89,98 | 2,72 | 8,57 |
| 6 | 25,37 | 85,54 | 7,15 | 16,78 |
| 8 | 8,01 | 74,54 | 14,83 | 19,98 |
| 10 | 6,92 | 69,00 | 25,51 | 18,30 |

It is surprising, that in the smallest fractions (sieve gap 4 mm, or less), there is not much bark attached to the chips, whereas in chips above this size the proportion of chips with bark attached is considerable. Because mechanical processing in any event reduces the size of the wood chips across the board, it is advantage s to separate this fairly clean part of the wood chips and have it bypass the mechanical processing. There is bark as such even in the smallest chips, but it is loose, and most of it leaves during the separation of the sawdust, which has been moved so that it takes place after the mechanical processing.

These and other features and advantages of the invention will be more fully understood from the following detailed description of the invention taken together with the accompanying drawings, which show schematically one plant according to the invention and the method used in it.

DETAILED DESCRIPTION OF THE INVENTION

Figure 1:
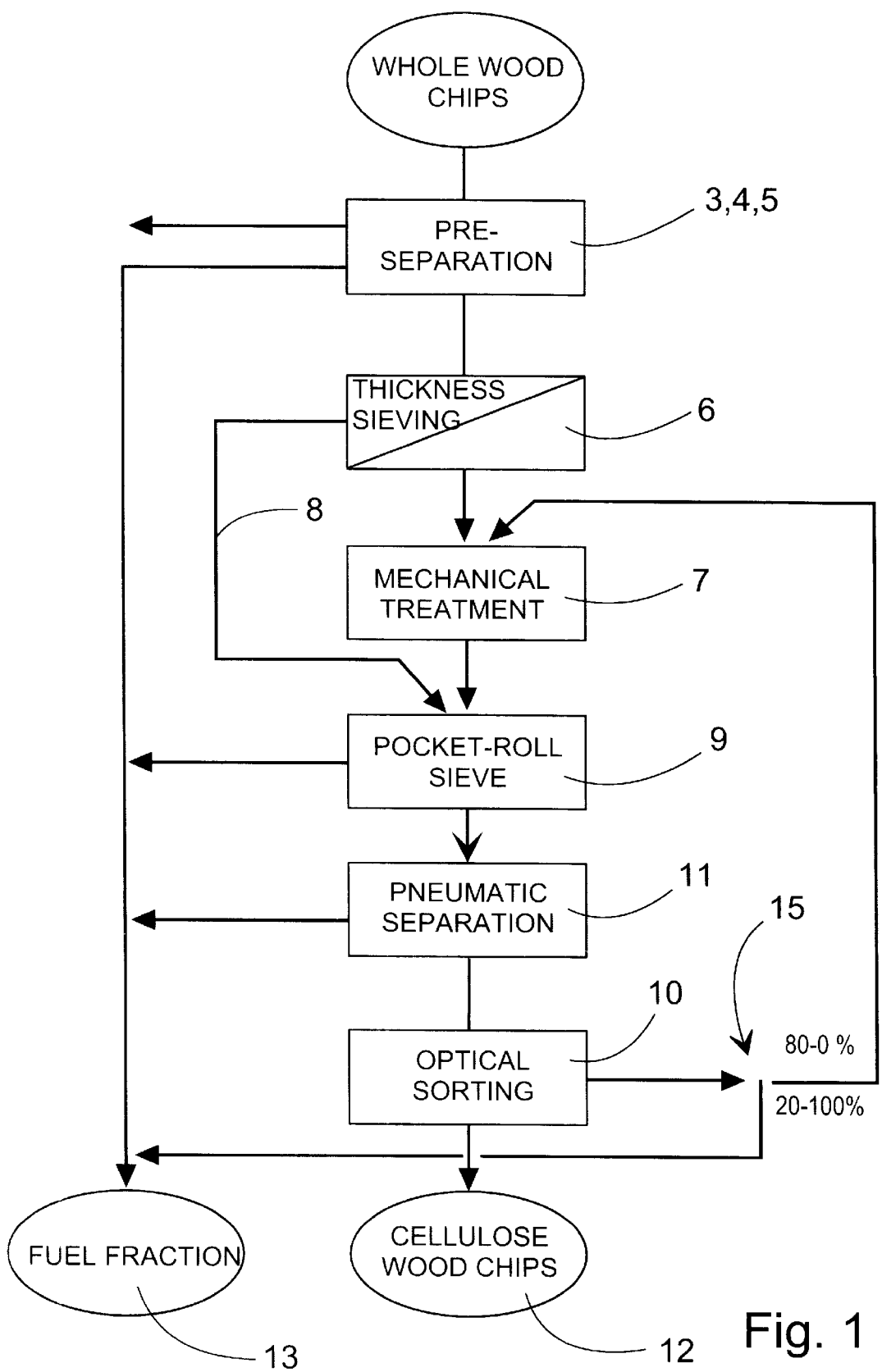
FIG. 1 illustrates the method according to the invention, as a block diagram.

Referring now to the drawings in detail, in the diagram in FIG. 1, the wood chips with bark attached can be considered as having been obtained by conventional methods, using a known cutter. In the first stage of processing, the wood chips are cleaned in pre-separation 3, 4, 5, which comprises, among other things, magnetic devices for removing scrap iron and a pneumatic separator 4, 4' for removing stones and sand. In pre-separation, oversize wood chips are separated by means of disc sieve 5, and in practice are most advantageously led to the fuel fraction, but if necessary they can be led, for example, to a crusher and then back to pre-separation. The fraction accepted in pre-separation 3, 4, 5 is led to thickness sieving 6, which is intended to separate the thin wood chip fraction, generally less than 6 mm, from the part of the flow of wood chips travelling through the thickness sieve. This part is led to the following stage, i.e. past mechanical bark separation 7. Mechanical bark separation can take place by means of either a plate grinder, a crusher, or in a blade ring chipper, which has been shown to be the most advantageous, because it does not defibrate the wood material unnecessarily.

The mechanically processed fraction, together with the smaller fraction obtained from the bypass line, is led to pocket-roll sieve 9, which effectively removes the sawdust from the flow of material. After this, the accepted fraction is led to a pneumatic separator, to remove light birch bark, leaves, needles, and other easily airborne particles from the flow of material. After this, the pre-cleaned wood chips already have a bark content of less than 10%, and can be led to optical sorter 10, from which wood chips with a bark content of about 1% can be obtained, even at a large yield. Reject from the optical sorter is led through selection 15 in a regulated manner either to the fuel fraction, or back to mechanical processing. In order to prevent a so-called 'mad cycle', 20–100% is always led to the fuel fraction, and only 80–0% is led to the mechanical processing. Certain species of timber or other conditions will mean that there is not necessarily any benefit from mechanical processing, in which case it is better to lead the reject from the optical sorter directly to the fuel fraction.

Figure 2:
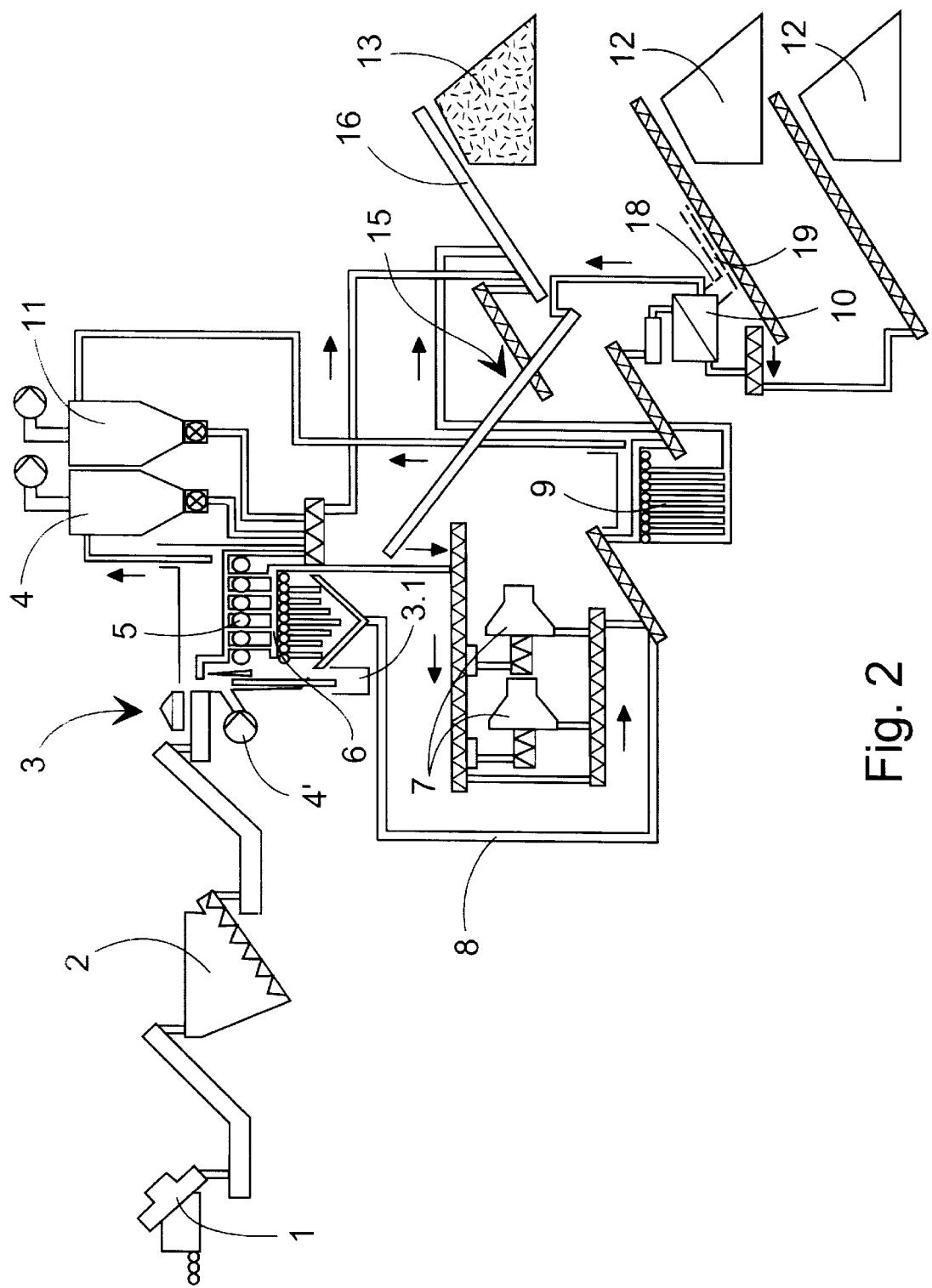
FIG. 2 illustrates equipment according to the invention, as a plant diagram.

The plant diagram of FIG. 2, shows cutter 1 and reception funnel 2, in which the wood chips are collected, or into which wood chips from external sources are poured. From here the flow of wood chips is led through magnetic separator 3 to disc sieve 5. Between these there is a pneumatic separator 4', which removes stones and a second pneumatic separator 4, which sucks light birch bark, leaves, and fine dust into the airflow, see also stone store 3.1. A disc sieve 5 removes oversized pieces from the wood chips, which are led to the fuel fraction 13, together with reject from the pneumatic separator. Beneath the disc sieve there is a thickness sieve 6, which separates the smallest fraction and the sawdust in it, these being led to mechanical bark separation, going past grinder 7, whereas the rest of this part is led to grinder 7. Experiments have, however, shown that bark can be effectively separated by cutting the chips. The mechanically processed chip fraction obtained from the plate grinder and the thin fraction obtained from the bypass line 8 are led to the Pocket-Roll sieve 9, which removes sawdust and fine bark material from the flow of chips. After the Pocket-Roll sieve, there is a pneumatic separator 11, which removes light birch bark, leaves, needles, and other easily airborne material.

The accepted fraction is led to optical sorter 10, from which a good yield of good quality cellulose wood chips 12 are obtained. The reject is led through selection member 15, either to the fuel fraction 13 or to the grinder 7. Using selection member 15, 0–100% can be taken from the flow of materials into the fuel fraction. It is advantageous to take at least 20%, to prevent a so-called 'mad cycle' in the process. With certain grades of wood chips part of the material would remain to circulate continuously through the process, unless part of the reject is removed to the fuel fraction. All of the removed rejects are led in the figure to fuel fraction 13, by means of conveyor 16.

Because the optical sorter uses a pneumatic conveyor, the reject flow is not homogeneous. A divider plate 18 set in the exit area can separate the part with the greatest bark content from the rest of the reject, it then being advantageously led directly to the fuel fraction with the aid of conveyor 19. The figure shows this alternative by broken lines.

The pulverization of the wood is reduced with the aid of the method according to the invention, which increases the cellulose chip yield from the previous yield by 5–10 percentage units, while the fraction of cellulose chips remaining in the 13 mm particle size perforated sieve increases substantially (by 15–35 percentage units).

In equipment according to the invention, a thickness sieve is used to separate the fraction with the desired value, 4–8 mm, for example, thinner than 6 mm, which is led past the barking separation and the thicker wood chips are fed to the mechanical bark separation. These fractions are combined and the sawdust and light birch bark is sieved out and sorted optically, the accepted fraction of which is clean wood chips and the reject is returned to mechanical bark separation, in which the bark is ground to a smaller size, so that it can be distinguished in the sawdust discharge.

Improvement of the cellulose wood chip yield by 5 percentage units improves the profitability of the plant by about FIM 20/m$^3$, which represents FIM 3 000 000 p.a. in a plant producing 150 000 m$^3$ p.a.. The effect of the chip size of cellulose wood chips on the sales price varies from case to case, but at its greatest is about FIM 25/m$^3$. Together these correspond, in magnitude, to the operating and capital costs of the plant, so that the economy of the method improves substantially.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method for manufacturing predetermined low bark content wood chips and a high bark content fuel fraction from wood chips with bark attached, comprising the steps of:

sieving the wood chips with bark attached into a predetermined thin wood chip fraction and sieving overflow chips;

mechanically removing bark from the sieving overflow chips, thereby producing smaller overflow chips, and pre-cleaning, with the aid of pneumatic and mechanical sieving, the predetermined thin wood chip fraction and the smaller overflow chips, into a flow of chips with a bark content of less than 10% and a first fraction of higher bark content rejects;

final cleaning of said flow of chips with a bark content of less than 10%, with the aid of an optical sorter, to create low bark content wood chips and a second fraction of higher bark content rejects;

collecting at least part of said first and second higher bark content rejects to create said high bark content fuel fraction.

2. The method according to claim 1, characterized in that the step of mechanically removing bark from a flow of chips having bark attached takes place by means of a grinder, press-rollers, or a crusher.

3. The method according to claim 1, characterized in that the step of mechanically removing bark from a flow of chips having bark attached takes place using a a blade ring chipper, which cuts the wood chips into smaller pieces, while removing the bark.

4. The method according to claim 1, characterized in that 20–100% of the second fraction of higher bark content rejects obtained from the optical sensor is directed to the fuel fraction, while 80–0% is returned to the step of mechanically removing bark.

5. The method according to claim 4, characterized in that the optical sensor includes a pneumatic conveyor and a division plate, by means of which the flow of chips with a bark content of less than 10% is divided first into said low bark content wood chips and said second fraction of higher bark content rejects, said second fraction of higher bark content rejects being further divided with the aid of the division plate directly into a fuel fraction, with a remainder of said second fraction of higher bark content rejects being returned to the step of mechanically removing the bark.

6. The method according to claim 1, characterized in that it includes a pre-separation step before the sieving step, in which oversized wood chips, stones, and metals are removed from the wood chips with bark attached.

7. The method according to claim 1, characterized in that the predetermined thin wood chip fraction and smaller overflow chips are sieved using a mechanical sieve, to remove sawdust as a third reject and by using a pneumatic separator to remove light birch bark, leaves, needles, and other airborne material as a fourth reject.

8. Apparatus for manufacturing wood chips with a low bark content from wood chips with bark attached, said apparatus comprising:

a wood chip thickness sieve for separating the flow of wood chips with bark attached into an outflow of a predetermined thin wood chip fraction and an outflow of sieving overflow chips;

a mechanical bark removal device functionally integrated with said wood chip thickness sieve;

pre-cleaning devices functionally integrated with said mechanical bark removal device, said pre-cleaning devices comprising a mechanical and a pneumatic separator and an optical sorter;

said apparatus further including a correction line functionally integrated between said wood chip thickness sieve and said pre-cleaning devices to receive said outflow of said predetermined thin wood chip fraction so that said predetermined thin fraction bypasses said mechanical bark removal devices and flows directly to the pre-cleaning devices.

9. Equipment according to claim 8, characterized in that the mechanical bark removal devices consist of at least one of a blade ring chipper, a grinder, a press roller, and a crusher.

* * * * *